United States Patent [19]

Komatsu et al.

[11] Patent Number: 4,671,912

[45] Date of Patent: Jun. 9, 1987

[54] METHOD OF MANUFACTURING SINTERED CERAMIC BODY

[75] Inventors: Michiyasu Komatsu, Yokohama; Tadashi Miyano, Sagamihara; Akio Ando, Kawasaki; Masae Nakanishi, Chigasaki; Yuuji Fujimoto, Yokohama, all of Japan

[73] Assignee: Kabushiki Kaisha Toshiba, Kawasaki, Japan

[21] Appl. No.: 831,725

[22] Filed: Feb. 21, 1986

Related U.S. Application Data

[63] Continuation-in-part of Ser. No. 644,923, Aug. 27, 1984, abandoned.

[30] Foreign Application Priority Data

Aug. 30, 1983 [JP] Japan .................. 58-158570

[51] Int. Cl.$^4$ .................................. C04B 33/32
[52] U.S. Cl. ....................... 264/63; 264/65; 501/97
[58] Field of Search ............. 264/63, 65; 501/97

[56] References Cited

U.S. PATENT DOCUMENTS

| | | | |
|---|---|---|---|
| 3,238,048 | 3/1966 | Somers | 264/63 |
| 4,000,110 | 12/1976 | Saito et al. | 264/63 |
| 4,126,653 | 11/1978 | Smith et al. | 264/63 |
| 4,233,256 | 11/1980 | Ohnsorg | 264/63 |

FOREIGN PATENT DOCUMENTS

| | | | |
|---|---|---|---|
| 58-020775 | 2/1983 | Japan | 264/63 |
| WO80/0079 | 1/1980 | PCT Int'l Appl. | |
| 2011952 | 7/1979 | United Kingdom | 501/97 |

Primary Examiner—James Derrington
Attorney, Agent, or Firm—Cushman, Darby & Cushman

[57] ABSTRACT

A sintered ceramic body is manufactured first by preparing a composition containing a binder and a ceramic powder having a particle size distribution given such that 0 to 1 weight % of ceramic particles with a particle size of less than 0.2 μm, 0 to 2 weight % of ceramic particles with a particle size of 0.2 μm to less than 0.5 μm, 5 to 15 weight % of ceramic particles with a particle size of 0.5 μm to less than 1.0 μm, 5 to 15 weight % of ceramic particles with a particle size of 1.0 μm to less than 1.5 μm, 5 to 15 weight % of ceramic particles with a particle size of 1.5 μm to less than 2.0 μm, and 50 to 80 weight % of ceramic particles with a particle size of not less than 2.0 μm. The prepared composition is then injection-molded into a predetermined shape. The binder is removed from the molded body, and the binder-free molded body is sintered.

6 Claims, No Drawings

METHOD OF MANUFACTURING SINTERED CERAMIC BODY

CROSS REFERENCE TO THE RELATED APPLICATION

This application is a continuation-in-part of application Ser. No. 644,923, filed on Aug. 27, 1984 now abandoned.

BACKGROUND OF THE INVENTION

The present invention relates to a method of manufacturing a sintered ceramic body by forming a ceramic powder into a predetermined shape by injection molding and sintering the molded body.

In a conventional method of manufacturing a sintered body made of a ceramic material such as silicon nitride, a sintering accelerator is added to a ceramic powder, and a resultant mixture is sintered in a mold having a cavity of a predetermined shape at a pressure of 150 to 500 kg/cm² at a temperature of 1,700° to 1,800° C. This method is called hot pressing. According to this method, a sintered body having a high density and high mechanical strength can be obtained. However, it is difficult to prepare a sintered body of complicated shape by the hot pressing. In addition to this disadvantage, hot pressing is not suitable for mass production.

Recently, a sintering method has received a great deal of attention, since it allows mass production. The sintering method involves adding an organic binder to a mixture of a ceramic powder and a sintering accelerator, and injection-molding the resultant composition. The binder is then removed from the molded body, and the molded body which is free from the binder is sintered. A conventional ceramic powder used for injection molding is obtained by milling a ceramic material in a solvent such as n-butanol to obtain a ceramic powder. The conventional ceramic powder obtained by this wet milling is low in packing density, thus requiring a large amount of binder and a long period of time for removing the binder. In addition, contraction of the material during sintering is great. As a result, a sintered ceramic body having precise dimensions cannot be prepared.

SUMMARY OF THE INVENTION

The present inventors have made extensive studies in order to solve the conventional drawbacks and found that the packing property of the ceramic powder is related to its particle size distribution, and that the packing property can be improved by widening the particle size distribution within a predetermined range.

Accordingly, it is an object of the present invention to provide a method of manufacturing a sintered ceramic body, wherein a particle size distribution range of a ceramic powder is widened to improve a packing property thereof, and a smaller amount of binder is required, as compared with the amount of binder needed in the conventional method.

According to the present invention, a composition is first prepared which contains a binder and a ceramic powder having a particle size distribution given such that 0 to 1 weight % of ceramic particles with a particle size of less than 0.2 μm, 0 to 2 weight % of ceramic particles with a particle size of 0.2 μm to less than 0.5 μm, 5 to 15 weight % of ceramic particles with a particle size of 0.5 μm to less than 1.0 μm, 5 to 15 weight % of ceramic particles with a particle size of 1.0 μm to less than 1.5 μm, 5 to 15 weight % of ceramic particles with a particle size of 1.5 μm to less than 2.0 μm, and 50 to 80 weight % of ceramic particles with a particle size of not less than 2.0 μm. The binder is contained in the composition in an amount of 15 to 25 weight % of the total weight of the ceramic powder. The composition is then injection-molded in a predetermined shape to obtain a molded body. The binder is removed from the molded body by heating. Finally, the molded body which is free from the binder is sintered to prepare a sintered ceramic body.

DETAILED DESCRIPTION OF THE PREFERRED EMBODIMENT

As described above, the ceramic powder used in the present invention has a specified particle size distribution. The particles having a size of less than 0.2 μm occupies 0 to 1% by weight of the total weight of the powder; the particles having a size of 0.2 μm to less than 0.5 μm occupies 0 to 2% by weight of the total weight of the powder; the particles having a size of 0.5 μm to less than 1.0 μm occupies 5 to 15% by weight of the total weight of the powder; the particles having a size of 1.0 μm to less than 1.5 μm occupies 5 to 15% by weight of the total weight of the powder; the particles having a size of 1.5 μm to less than 2.0 μm occupies 5 to 15% by weight of the total weight of the powder; and the particles having a size of not less than 2.0 μm occupies 50 to 80% by weight of the total weight of the powder. The maximum particle size is preferably 30 μm and more preferably 20 μm.

The ceramic powder having the above-mentioned particle size distribution may preferably be prepared by adding, as needed, a milling accelerator such as oleic acid and stearic acid to a mixture of a powdery ceramic material such as silicon nitride and a sintering accelerator such as rare earth oxide (e.g., yttrium oxide), alumina, titanium dioxide and aluminum nitride, and dry-milling the resultant composition in a ball mill for 24 to 100 hours. Alternatively, the ceramic powder may preferably be prepared by adding, as needed, the milling accelerator to the powdery ceramic material or a mixture of the powdery ceramic material and the sintering accelerator, and performing a heat treatment of the resultant composition in an atmosphere of an inert gas such as nitrogen at a temperature of 1,500° to 1,750° C. for 30 minutes to 2 hours. The heat-treated composition is then dry-milled. In any case, the sintering accelerator is added such that rare earth oxide is 10% by weight or less, alumina is 10% by weight or less, aluminum nitride is 10% by weight or less and titanium oxide is 5% by weight or less, based on the total weight of the ceramic powder and that the total weight thereof is 5 to 15% by weight.

The resultant ceramic powder has a wide particle size distribution range and good packing properties.

When the starting powdery ceramic material has an average particle size of not more than about 20 μm, the resultant ceramic powder has better packing properties. In particular, when the starting powdery ceramic material having an average particle size of about 10 μm or less (e.g., 1–10 μm) is used, packing properties of the resultant ceramic powder can be greatly improved.

According to the present invention, 15 to 25 weight %, preferably, 18 to 22 weight % of a binder such as paraffin, a styrene resin or an ethylene resin is added to and mixed with the resultant ceramic powder. The resultant composition is injection-molded into a predetermined shape. A molding temperature is preferably 70° to 80° C. for the paraffin binder and 180° to 220° C. for the resin binder. The molded body is then heated to remove the binder. The heating is usually conducted in a vacuum, inert gas or reducing atmosphere at a temperature of 600° to 900° C., preferably 700° to 800° C. Abrupt heating must be avoided in order to prevent the molded body from blistering. When the paraffin binder is used, it is preferred that the molded body is gradually heated at a heating rate of 1° to 2° C./hour to a temperature of 300° C. When the resin binder is used, it is preferred that the molded body is gradually heated at a heating rate of 1° to 2° C./hour to a temperature of 500° C. When gradual heating is performed and about half of the binder is removed, the heating rate may be increased.

Finally, the molded body from which the binder has been removed is sintered. The sintering is preferably effected at atmospheric pressure in an inert gas or reducing atmosphere at a temperature of 1,600° to 1,900° C., preferably 1,700° to 1,800° C. Thus, a sintered ceramic body having a desired shape can be obtained.

The present invention will be best understood by way of examples and a comparative example described below.

EXAMPLE 1

10 g of oleic acid were added to a mixture of 1,000 g of a powdery silicon nitride having an average particle size of 1.0 to 10 μm and 100 g of a sintering accelerator (yttrium oxide, alumina and aluminum nitride mixed at a weight ratio of 2:1:1). The resultant mixture was dry-milled by an alumina ball mill for about 70 hours. The powder was sieved to prepare about 1 weight weight % of ceramic particles with a partical size of less than 0.2 μm, 2 weight % of ceramic particles with a particle size of 0.2 μm to less than 0.5 μm, 10 weight % of ceramic particles with a particle size of 0.5 μm to less than 1.0 μm, 15 weight % of ceramic particles with a particle size of 1.0 μm to less than 1.5 μm, 15 weight % of ceramic particles with a particle size of 1.5 μm to less than 2.0 μm, and 57 weight % of ceramic particles with a particle size of not less than 2.0 μm. A packing property (tap density) of the resultant ceramic powder was 45 to 47%. Paraffin was added to the ceramic powder in the amount of 18 to 20 weight % based on the total weight of the ceramic powder. A turbo charger rotor was injection-molded using this composition. The molded body was heated in nitrogen gas at a temperature of 700° to 800° C. to remove the binder. The binder was completely removed in 100 to 125 hours, a period half that in the conventional method. The molded body which was free from the binder was sintered in a nitrogen gas atmosphere at a temperature of 1,750° C. for two hours. The contraction percentage of the sintered body was 12 to 14%.

EXAMPLE 2

A mixture of 1,000 g of a powdery silicon nitride having an average particle size of 1.0 to 10 μm and 100 g of a sintering accelerator (yttrium oxide, alumina and aluminium nitride mixed at a weight ratio of 1:1:1) was heated in a nitrogen atmosphere at a temperature of 1,600° C. for one hour. Subsequently, 10 g of oleic acid were added to the mixture, and the resultant composition was dry-milled by a ceramic ball mill for about 70 hours, thereby preparing a ceramic powdery having a particle size distribution given by 0.1 weight % of ceramic particles with a particle size of less than 0.2 μm, 0.9 weight % of ceramic particles with a particle size of 0.2 μm to less than 0.5 μm, 10 weight % of ceramic particles with a particle size of 0.5 μm to less than 1.0 μm, 14 weight % of ceramic particles with a particle size of 1.0 μm to less than 1.5 μm, 10 weight % of ceramic particles with a particle of 1.5 μm to less than 2.0 μm, and about 65 weight % of ceramic particles with a particle size of not less than 2.0 μm. A packing property (tap density) of the resultant ceramic powder was 48 to 50%. Paraffin was added to the ceramic powder in the amount of 16 to 18 weight % with respect to the total weight of the ceramic powder, thereby preparing a turbo charger rotor. Under the same conditions as in Example 1, the binder was removed from the molded rotor and the molded rotor which was free from the binder was sintered. It took the binder 50 to 75 hours to be removed. The contraction percentage of the sintered body was 10 to 12%.

COMPARATIVE EXAMPLE 1,500 g of n-butyl alcohol were added to a mixture of 1,000 g of a powdery silicon nitride having an average particle size of 1 to 10 μm and 100 g of a sintering accelerator (yttrium oxide, alumina and aluminum nitride were mixed at a weight ratio of 2:1:1). The resultant mixture was milled by a ceramic ball mill for 70 hours to prepare a ceramic powder. The particle size distribution of this ceramic powder was given by 3 weight % of ceramic particles with a particle size of less than 0.2 μm, 18 weight % of ceramic particles with a particle size of 0.2 μm to less than 0.5 μm, 47 weight % of ceramic particles with a particle size of 0.5 μm to less than 1.0 μm, 15 weight % of ceramic particles with a particle size of 1.0 μm to less than 1.5 μm, 10 weight % of ceramic particles with a particle size of 1.5 μm to less than 2.0 μm, and 7 weight % of ceramic particles with a particle size of not less than 2.0 μm. A packing property (tap density) of this ceramic powder was 30 to 32%. In order to injection-mold the ceramic powder to prepare the same turbo charger rotor as in Example 1, 30 to 35 weight % of binder had to be added to the ceramic powder. When the binder was removed from the molded body under the same conditions as in Example 1, the binder took 250 to 300 hours to be removed. When the molded body free from the binder was sintered as in Example 1, cracks occurred in the sintered body. In addition, the contraction percentage of the sintered body was 20 to 23%.

As is apparent from the above examples, according the method of the present invention, the packing properties of the ceramic powder can be improved, only a small amount of binder is required, the density of the molded body is increased, and the time required for removing the binder can be shortened. In addition to these advantages, the contraction percentage of the sintered body is small, and complicated sintered bodies such as a turbo charger rotor and the like can be manufactured with high precision.

What is claimed is:

1. A method of manufacturing a sintered ceramic body, comprising the steps of:
   preparing a composition containing a binder and a ceramic powder having a particle size distribution given such that 0 to 1 weight % of ceramic particles with a particle size of less than 0.2 μm, 0 to 2 weight % of ceramic particles with a particle size of 0.2 μm to less than 0.5 μm, 5 to 15 weight % of ceramic particles with a particle size of 0.5 μm to less than 1.0 μm, 5 to 15 weight % of ceramic particles with a particle size of 1.0 μm to less than 1.5 μm, 5 to 15 weight % of ceramic particles with a particle size of 1.5 μm to less than 2.0 μm, and 50 to 80 weight % of ceramic particles with a particle size of not less than 2.0 μm, said binder being contained in said composition in an amount of 15 to 25 weight % of the total weight of said ceramic powder;

injection-molding said composition into a predetermined shape to obtain a molded body;

removing said binder from said molded body by heating; and sintering said molded body from which said binder has been removed, thereby preparing a sintered ceramic body.

2. The method according to claim 1, wherein said ceramic powder is prepared by milling in a dry atmosphere a starting mixture of a powdery silicon nitride having an average particle size of 1.0 to 10 μm and a sintering accelerator.

3. The method according to claim 1, wherein said ceramic powder is prepared by heating, in an inert gas atmosphere, a starting mixture of a powdery silicon nitride having an average particle size of 1.0 to 10 μm and a sintering accelerator, and milling said mixture.

4. The method according to claim 3, wherein said starting mixture is heated at a temperature falling within a range between 1,400° C. and 1,750° C.

5. The method according to claim 1, wherein said binder is heated at a temperature falling within a range between 600° C. and 900° C. and is so removed.

6. The method according to claim 1, wherein said molded body is sintered in an inert or reducing atmosphere at a temperature falling within a range between 1,600° C. and 1,900° C.

* * * * *